United States Patent
Hartzell, Jr.

(10) Patent No.: US 6,224,463 B1
(45) Date of Patent: May 1, 2001

(54) WORKPIECE FINISHING SYSTEM AND METHOD OF OPERATING SAME

(75) Inventor: John C. Hartzell, Jr., Trenton, MI (US)

(73) Assignee: J.C.J. Metal Processing, Incorporated, Southgate, MI (US)

( * ) Notice: Subject to any disclaimer, the term of this patent is extended or adjusted under 35 U.S.C. 154(b) by 0 days.

(21) Appl. No.: 09/184,192

(22) Filed: Nov. 2, 1998

(51) Int. Cl.$^7$ ....................................................... B24B 1/00

(52) U.S. Cl. ................................ 451/40; 451/87; 451/88; 451/446; 451/447

(58) Field of Search ................................ 401/40, 87, 88, 401/446, 447

(56) References Cited

U.S. PATENT DOCUMENTS

| | | |
|---|---|---|
| 3,237,351 | 3/1966 | Millhiser . |
| 3,553,895 | 1/1971 | Power . |
| 3,791,801 | 2/1974 | Ariga et al. . |
| 3,905,898 | 9/1975 | Jackson . |
| 3,963,527 | 6/1976 | Lindemann . |
| 3,992,211 | 11/1976 | Skoll . |
| 4,738,056 | 4/1988 | Suzuki . |
| 4,817,342 | 4/1989 | Martin et al. . |
| 4,827,680 | 5/1989 | Rushing et al. . |
| 4,872,293 | 10/1989 | Yasukawa, deceased et al. . |
| 5,184,434 | 2/1993 | Hollinger et al. . |
| 5,393,228 | 2/1995 | Policicchio . |
| 5,477,844 | 12/1995 | Meister . |
| 5,545,074 * | 8/1996 | Jacobs ................................. 451/40 |
| 5,664,990 | 9/1997 | Adams et al. . |
| 5,791,970 | 8/1998 | Yueh . |
| 5,827,114 * | 10/1998 | Yam et al. ........................... 451/75 |
| 5,885,141 * | 3/1999 | Watkin ................................ 451/92 |
| 5,957,759 * | 9/1999 | Cardenas et al. ................... 451/60 |

FOREIGN PATENT DOCUMENTS

| | | |
|---|---|---|
| 2 235 587 | 1/1975 | (FR) . |
| 1 432 658 | 4/1976 | (GB) . |
| 2 050 217 | 1/1981 | (GB) . |

OTHER PUBLICATIONS

Metals Handbook, 8th Edition, vol. 2, "Heat Treating, Cleaning and Finishing", 1964, pp. 364–386.
Paper entitled "Powerblasting with Super–Water from 1974 to 1989: A Review", Dr. W. Glenn Howells, prior to Nov. 1998, pp. 1–12.
"Water Jetting Nozzle Catalog", 1990, entire catalog.
"Pneumatic Control Components" Booklet, prior to Nov., 1998.
Pneumatic Products, "PVL Series Power Valves In–line/Stackable with Modular Pilot System", File 9006, 1993, pp. 1–7.
Pneumatic Products, "Modular Micro–Valve/Interface System", File 9006, 1993.
"PVD Series Power Valves Stand Alone/Stackable with Modular Solenoid Pilot System", pp. 1–11, prior to Nov., 1998.
"The Electroplater's Handbook", C. W. Ammen, 1986, pp. 69–80.

(List continued on next page.)

Primary Examiner—David A. Scherbel
Assistant Examiner—Shantese McDonald
(74) Attorney, Agent, or Firm—Harness, Dickey & Pierce, P.L.C.

(57) ABSTRACT

A preferred embodiment of a workpiece finishing system impinges a grit and fluid slurry onto a workpiece and then recycles the slurry for subsequent reuse. In another aspect of the present invention, a recovery tank is used for generally settling and concentrating the grit in the slurry, and for separating out a portion of the fluid from the grit. A further aspect of the present invention provides a venturi-type nozzle for expelling the grit and fluid onto a workpiece, wherein the nozzle has a selectively movable inlet thereby varying the slurry concentration properties of the nozzle.

20 Claims, 7 Drawing Sheets

OTHER PUBLICATIONS

"Tight Shut–Off Gun & Unloader Valve", 6 pages, prior to Nov., 1998.

"Producing Vacuum without a Vacuum Pump", 1 page, prior to Nov., 1998.

1 page entitled "Grit Size No." prior to Nov., 1998.

"Water Jet Technology", vol. 1, 1990, pp. 15–16.

* cited by examiner

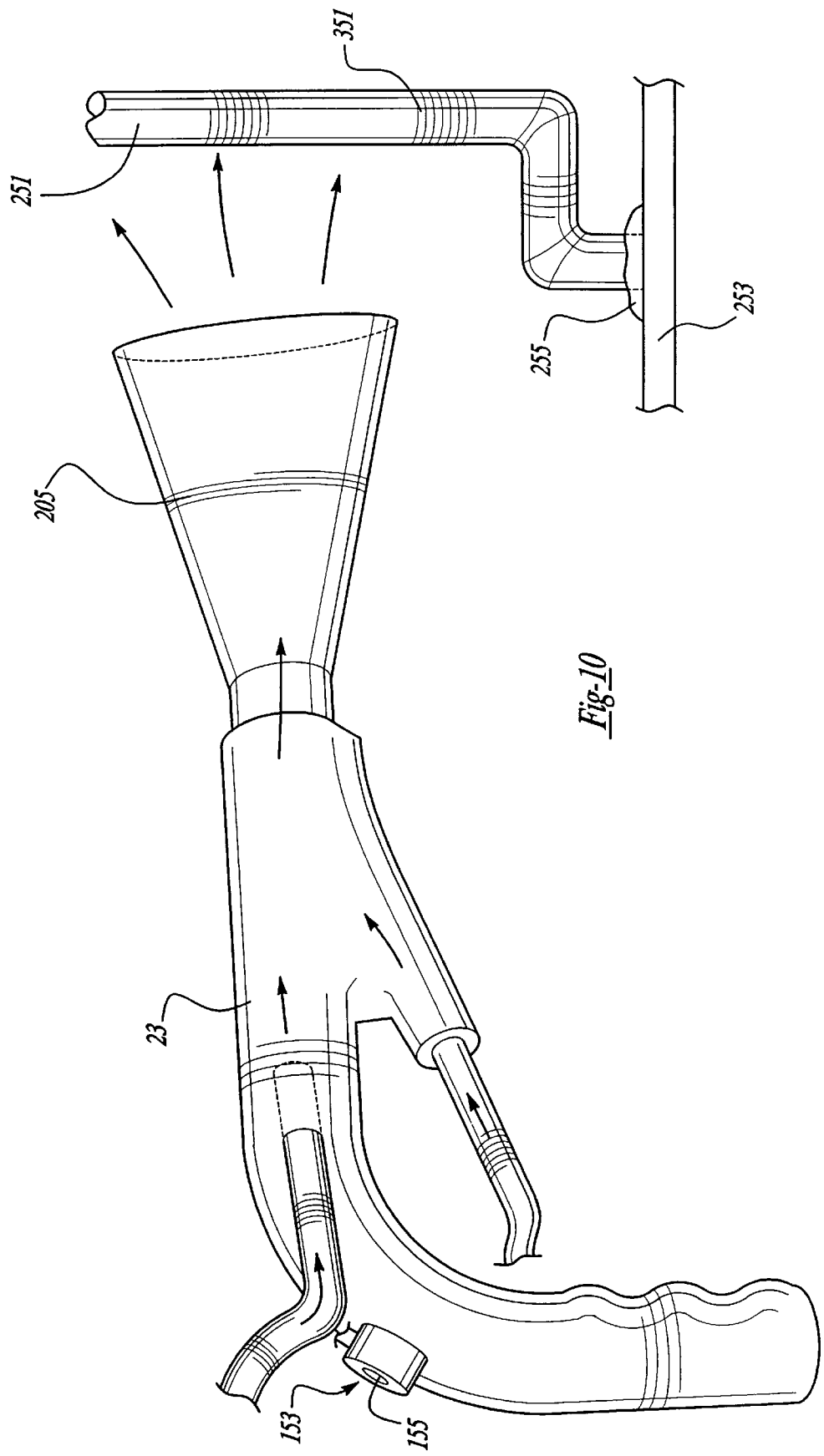

WORKPIECE FINISHING SYSTEM AND METHOD OF OPERATING SAME

BACKGROUND OF THE INVENTION

This invention relates generally to a workpiece finishing system, and more particularly to a system for impinging and recycling a grit and fluid slurry used to finish a workpiece.

Traditionally, metal workpieces must be belted, polished and then buffed prior to plating. The conventional wisdom has been that any "item to be plated, if the plating is to be a bright plate, must be highly polished. The plating can be no brighter than the surface to which it is applied." C. W. Ammen, *Electroplater's Handbook*, 1986, page 69, published by Tab Books Inc. The belting employs a course grit belt, or wheel, which must be replaced approximately every five or six pieces. The polishing and buffing wheels also require extensive manual preparation, set up and replacement. The belting, polishing and buffing steps are typically performed by hand and must be very meticulously and uniformly done to ensure a bright base surface. However, the workplace is often extremely contaminated with oil and the like, and the operations are often tedious and time-consuming. Accordingly, part-to-part inconsistencies are prevalent, and labor and scrap costs are significant. Furthermore, an animal tallow, fatty acid and wax grease-stick compound is used on the polishing wheels to retain grit. A subsequent high temperature or acidic washing step is often employed in an attempt to remove the polishing compound, but with limited success. Any polishing compound remaining on the workpiece during plating leads to unacceptable plating adhesion to the base material, thus causing a very high scrap rate during plating.

It is also know to use a sand and water slurry to clean, but not finish, metal workpieces. An exemplary water and sand abrasive system is disclosed in U.S. Pat. No. 4,817,342 entitled "Water/Abrasive Propulsion Chamber" which issued to Martin et al. on Apr. 4, 1989. It is common for such systems to simply discard the water and inexpensive sand after each use. Moreover, the sand is not of a fine enough grit and sufficient hardness to adequately finish a workpiece for subsequent plating or for grit reuse.

Moreover, various slurry recycling systems have been attempted. For example, reference should be made to the following U.S. Patent Nos.: U.S. Pat. No. 5,791,970 entitled "Slurry Recycling System for Chemical-Mechanical Polishing Apparatus" which issued to Yueh on Aug. 11, 1998; U.S. Pat. No. 5,664,990 entitled "Slurry Recycling in CMP Apparatus" which issued to Adams et al. on Sep. 9, 1997; and U.S. Pat. No. 5,477,844 entitled "Slurry Recovery System for a Wet Cutting Saw" which issued to Meister on Dec. 26, 1995; all of which are incorporated by reference herewithin. However, none of these traditional systems exhibit the quick, efficient, cost effective and high performance characteristics of the present invention which is suitable for use on a variety of workpieces.

SUMMARY OF THE INVENTION

In accordance with the present invention, a preferred embodiment of a workpiece finishing system impinges a grit and fluid slurry onto a workpiece and then recycles the slurry for subsequent reuse. In another aspect of the present invention, a recovery tank is used for generally settling and concentrating the grit in the slurry, and for separating out a portion of the fluid from the grit. A further aspect of the present invention provides a venturi-type nozzle for expelling the grit and fluid onto a workpiece, wherein the nozzle has a selectively movable inlet thereby varying the slurry concentration properties of the nozzle. Still another aspect of the present invention provides a liquid overflow shelf above a set of baffles in the recovery tank for assisting in the separation of the grit and a portion of the liquid, whereby the liquid can be recycled without grit damaging the high pressure pumping device. A method of operating a workpiece finishing system suitable for recycling a grit and fluid slurry is also provided.

The present invention workpiece finishing system is advantageous over conventional devices in that the present invention does not require the expensive, labor intensive and scrap inducing polishing and buffing steps prior to plating. It is also envisioned that the belting operation may be minimized or even potentially deleted with the present invention. The very fine size and significant strength of the preferred carbide and water slurry, in combination with the impinging angles and high pressures, provide a dull matte-type workpiece finish which is not bright. Notwithstanding, it has been found that this matte finish of the present invention provides a superior bright mirrored appearance to the final plated workpiece as compared to conventional belted, polished and buffed workpieces. The part-to-part consistency and repeatability is also tremendously improved. Furthermore, a polishing compound is not necessary by use of the present invention, thereby eliminating the conventional washing operation and significantly reducing over all cycle time and/or plating scrap rates. The slurry separation and recycling devices and function of the present invention allows the use of the carbide and water slurry to be cost effective in a production environment, considering the high cost of the carbide grit. Moreover, the present invention recovery tank and nozzle constructions minimize maintenance while encouraging flexible usage for different workpiece designs. Additional advantages and features of the present invention will become apparent from the following description and appended claims, taken in conjunction with the accompanying drawings.

BRIEF DESCRIPTION OF THE DRAWINGS

FIG. 10 is a perspective view showing an alternate embodiment nozzle and an alternate embodiment workpiece employed in the workpiece finishing system.

DETAILED DESCRIPTION OF THE PREFERRED EMBODIMENT

Figure 1:
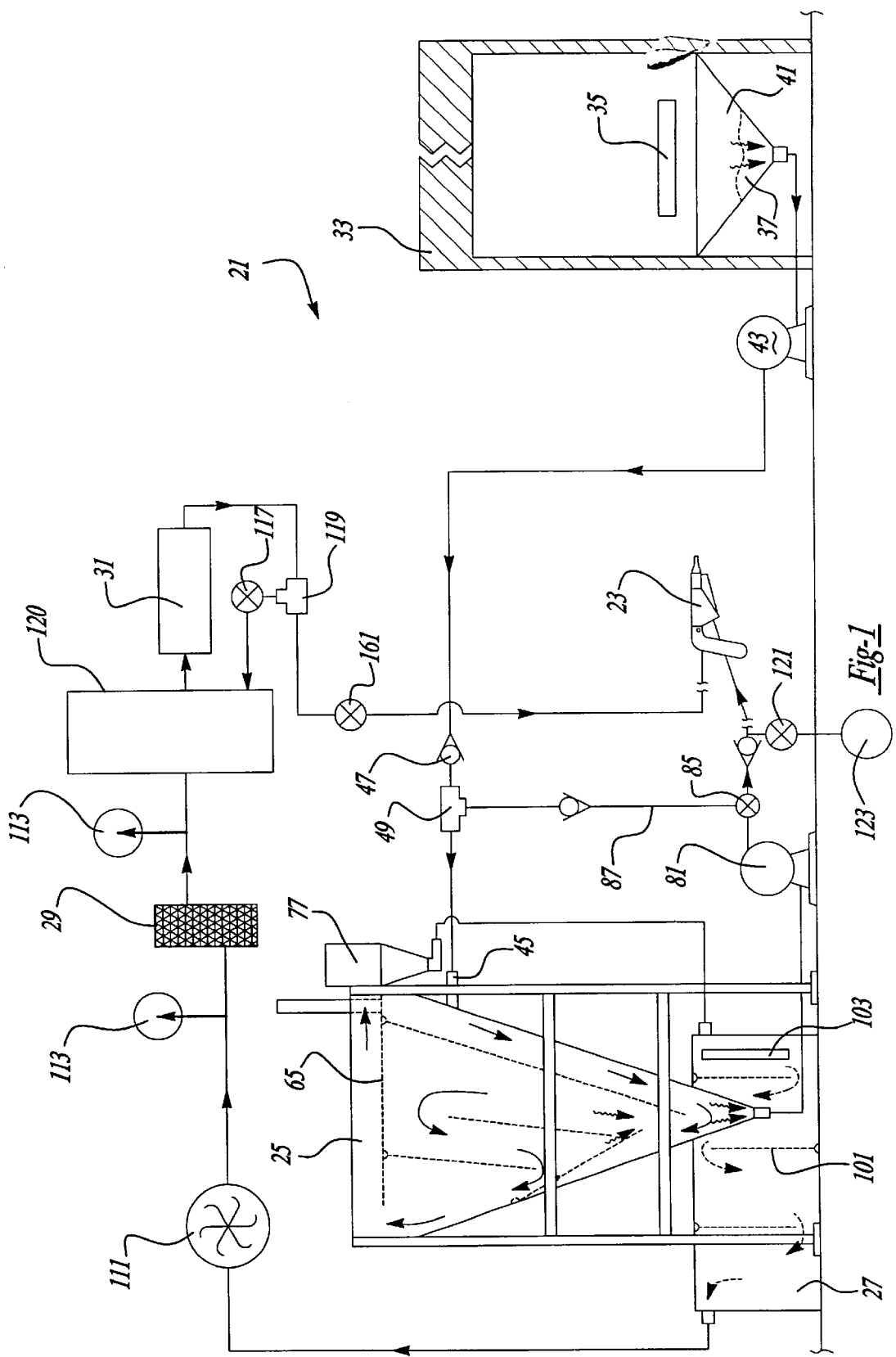
FIG. 1 is a schematic view showing the preferred embodiment of a workpiece finishing system of the present invention.

The preferred embodiment of a workpiece finishing system of the present invention is used to impinge a grit and fluid slurry upon a workpiece and to recycle the slurry for subsequent reuse. Referring to FIG. 1, workpiece finishing system 21 employs a nozzle 23, a recovery tank 25, a gravity separator 27, a media filter 29, a high pressure fluid pump 31 and a spray booth 33. A workpiece 35 is either stationarily clamped in place inside booth 33 or is located on a moving conveyor (not shown) inside booth 33. Workpiece 35 is preferably a metal part which can be of a flat sheet, rounded or contoured configuration. Nozzle 23 is preferably a handheld spray gun nozzle which operably sprays the slurry onto workpiece 35 inside booth 33. Alternately, nozzle 23 may be part of a robotically controlled reciprocating unit.

Spray booth 33 has a receptacle 41 located below workpiece 35 for receiving the slurry after the slurry is applied to workpiece 35 from nozzle 23. The slurry is preferably in the form of water and a very fine silicon carbide grit. Carbide of a 400–1200 grit is believed to be suitable and is maintained as an emulsion in the slurry. Furthermore, water is a superior fluid, as compared to air, for the present use due to the high slurry pressures needed to properly finish workpiece 35. Spray booth 33 additionally has a fan and a zigzag ceiling exhaust which deters airborne moisture from leaving booth 33. A diaphragm pump 43 is located in a first transmission line for flowing the used slurry 37 from receptacle 41 to an inlet 45 of recovery tank 25. A check valve 47 and a T-connector 49 are also disposed in the first transmission line. The transmission lines can be of any standard tube or pipe construction and length.

Figure 2:
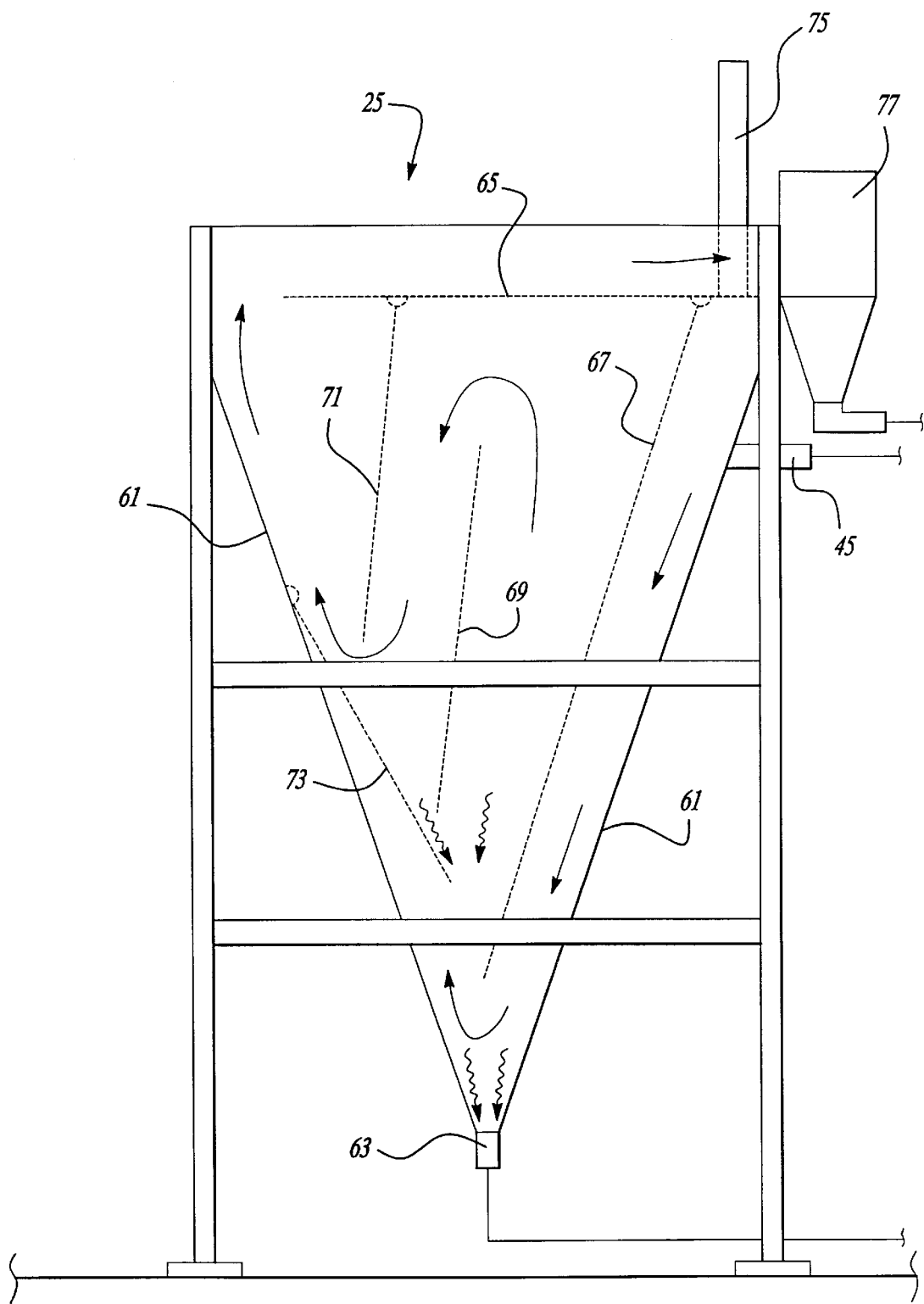
FIG. 2 is a side elevational view showing a recovery tank employed in the preferred embodiment workpiece finishing system.
Figure 3:
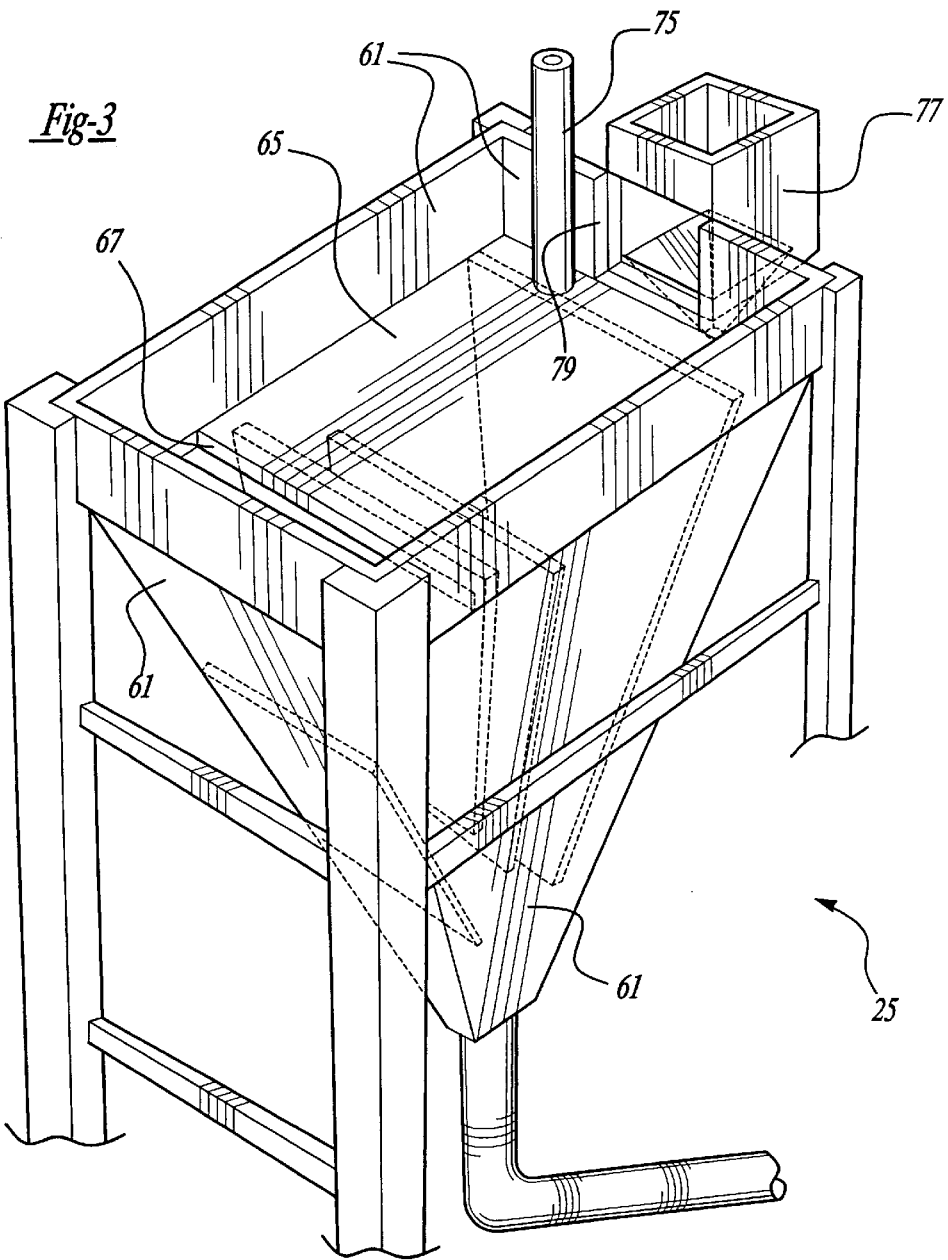
FIG. 3 is a perspective view showing the recovery tank employed in the preferred embodiment workpiece finishing system.

As can best be observed in FIGS. 2 and 3, recovery tank 25 has an outer casing consisting of four generally triangularly shaped walls 61 made of flat, stainless steel sheet metal and welded together at their edges. Furthermore, at outlet 63 is disposed in a bottom apex of walls 61. Side walls 61 have an approximately 20 degree angle off of a vertical plane. Additionally, a flat and horizontal shelf 65 is welded within the casing. Shelf 65 is spaced away from the wall 61 opposite inlet 45 such that a vertically open passageway 67 is thereby created. Shelf 65 is also located above inlet 45 but below the top edge of the casing.

Four baffles 67, 69, 71 and 73 are welded to a pair of opposite walls 61 and are all oriented in a somewhat vertically angled manner. The upper edges of baffles 67 and 71 are welded to an underside of shelf 65 while an upper edge of baffle 73 is welded to one side wall 61. It is also noteworthy that there is a very slight separation between baffles 69 and 73. An air vent 75 allows trapped air to escape from below shelf 65 while a water collector 77 is juxtaposed adjacent to an opening in one side wall 61 above shelf 65. Accordingly, the used slurry enters recovery tank 25 through inlet 45 and travels through the baffles in a serpentine-type flow pattern. This causes the grit to settle out of the slurry toward the bottom of the tank to create a highly concentrated grit and slurry composition while a predominantly water based portion of the slurry is allowed to gradually flow through passageway 67, above shelf 65 and out of collector 77 when the slurry is being expelled out of nozzle 23. The amount of water flowing above shelf 65 is directly proportional to the water flowing to the nozzle from the high pressure pump; in other words, when the nozzle is not actively spraying in a high pressure manner, no water will be flowing above shelf 65. Furthermore, the slurry flows slowly through the approximately four foot square wide by ten foot high recovery tank at about 30–40 pounds per square inch of pressure. The tank pressure depends on the driving pressure of diaphragm pump 81. The vertical construction of recovery tank 25 maximizes packaging in the manufacturing plant.

The highly concentrated slurry is then allowed to flow through a second transmission line from outlet 63 to another diaphragm pump 81 as is shown in FIG. 1. The slurry, again having a highly concentrated grit mixture, is then allowed to either flow to a grit inlet 83 (see FIG. 6) of nozzle 23 when slurry spaying is occurring, or to a three-way valve 85 which operably causes the concentrated grit mixture to flow through a bypass transmission line 87. Diaphragm pump 81 pumps at about twenty-five to thirty pounds per square inch, given a ninety pounds per square inch air source, whereby the grit is supplied to inlet 83 even when no high pressure water venturi action is occurring. During short non-spraying durations, such as for workpiece handling, the nozzle is placed in booth 33 so the grit concentrated slurry will flow at a low pressure back into receptacle 41 for reuse.

Bypass line 87 joins the first transmission line at T-connector 49 for recirculation back into recovery tank 25. Bypass line 87 is employed when nozzle 23 is not spraying the slurry. Agitation of the grit in the bottom of recovery tank 25 is necessary to avoid packing or immovable densification of the very fine grit in the bottom of recovery tank 25. This causes constant agitation and suspension of the grit in a portion of the water to allow free flowing, albeit in a concentrated form, of the settled slurry for eventual application through nozzle 23. Alternately, an agitation screw or propeller can be installed in the bottom of recovery tank 25 in place of bypass line 87. A nozzle clean out valve 121 and fresh water 123 are used to clean out the grit from nozzle 23 after a predetermined period of use, such as between shifts.

During active use, the separated water flows from collector 77 and through a third transmission line to an inlet of gravity separator 27. A set of alternating and generally vertical baffles 101 are positioned inside of gravity separator 27 for causing a second serpentine flow pattern of the water. This allows further settling out of any grit therein. A set of bar magnets 103 are also located in gravity separator 27 for removing metal offal sheared from workpiece 35 in the finishing process of the present invention. Periodically, the magnets will need to be cleaned and a bottom tray will need to be removed and cleaned. It is also envisioned that an anti-rust compound may need to be dripped into gravity separator 27.

A fourth transmission line subsequently carries the water exiting gravity separator 27 through a centrifugal pump 111, through media filter 29 and into high pressure fluid pump 31. This media filter 29 can removed grit as small as between one and five microns in size. A pair of pressure gauges 113 are positioned on the inflow and outflow sides of media filter 29 for detecting when the filter requires cleaning. A second media filter is in parallel to the first so water can temporarily flow through the second while the first is cleaned. A satisfactory high pressure fluid pump 31 is Model No. 32010SS which can be purchased from Tritan Corp. of Houston, Tex. High pressure pump 31 is of a triple piston type which can supply between 7,000 and 20,0000 pounds per square inch of water pressure.

A receiver tank 120 for holding the water is located between media filter 29 and pump 31. Receiver tank 120 has a capacity of around sixty gallons or more and ensures a sufficient water supply to pump 31. Pump 31 is allowed to constantly run regardless of nozzle activation. Another transmission line connects high pressure fluid pump 31 to a water inlet 115 (see FIG. 6) of nozzle 23. A ball valve 117 is connected to a T coupling 119 and disposed in this fluid transmission line to dump the water directly from high pressure fluid pump 31 to receiver tank 120, when nozzle 23 is not actively spraying.

Figure 4:
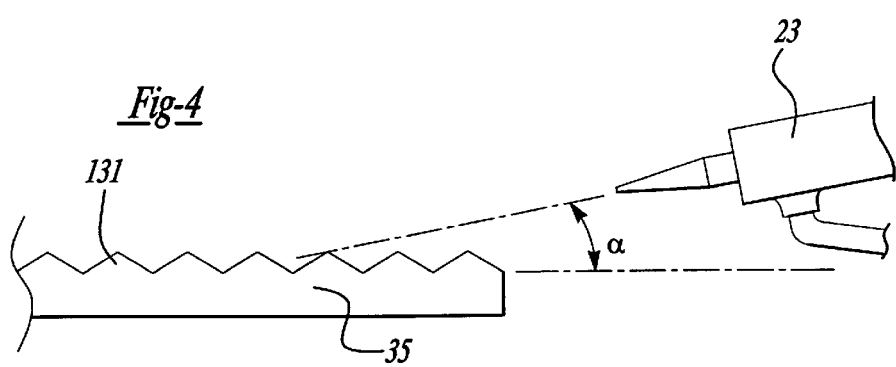
FIG. 4 is an exaggerated diagrammatic view showing a workpiece and nozzle employed in the preferred embodiment workpiece finishing system.

Referring to FIG. 4, nozzle 23 expels the mixed high pressure water and grit slurry upon the surface of workpiece 35 that is desired to be finished. The slurry impinges upon the work surface at an acute angle a relative to the plane of the part. If the workpiece is hardened steel, for example, an a angle of about 10–15 degrees is used with the nozzle placed within about one inch of the work surface while employing between about 8,000–9,000 pounds per square inch of water pressure measured at the high pressure fluid pump. In another example, a softer workpiece material such as one made of aluminum, brass or copper may require an a angle of about 3–4 degrees, about 4,000 pounds per square inch of water pressure, and it may be desirable to place the nozzle about 1–2 inches from the work surface. Generally, α angles between 2 and 30 degrees are preferred. The impingement of slurry at the preferred acute angles and high pressures serves to shear off extreme portions of discontinuities 131, such as machining marks, common manufacturing voids or the like, thereby leaving a more uniform and finished surface. The present invention can provide a one micro inch width of depression on the finished workpiece surface as compared to the traditional two-four micro inch width. However, the finished surface of workpiece 35 has a dull matte-like appearance rather than a bright and shiny one. Thus, conventional polishing, buffing or use of a grease compound is not needed for this finishing operation. While a minor amount of belting (in cross directions) may be required prior to the slurry impingement finishing operation, this may not always be necessary depending on the quality of finish desired and slurry performance.

Figure 5:
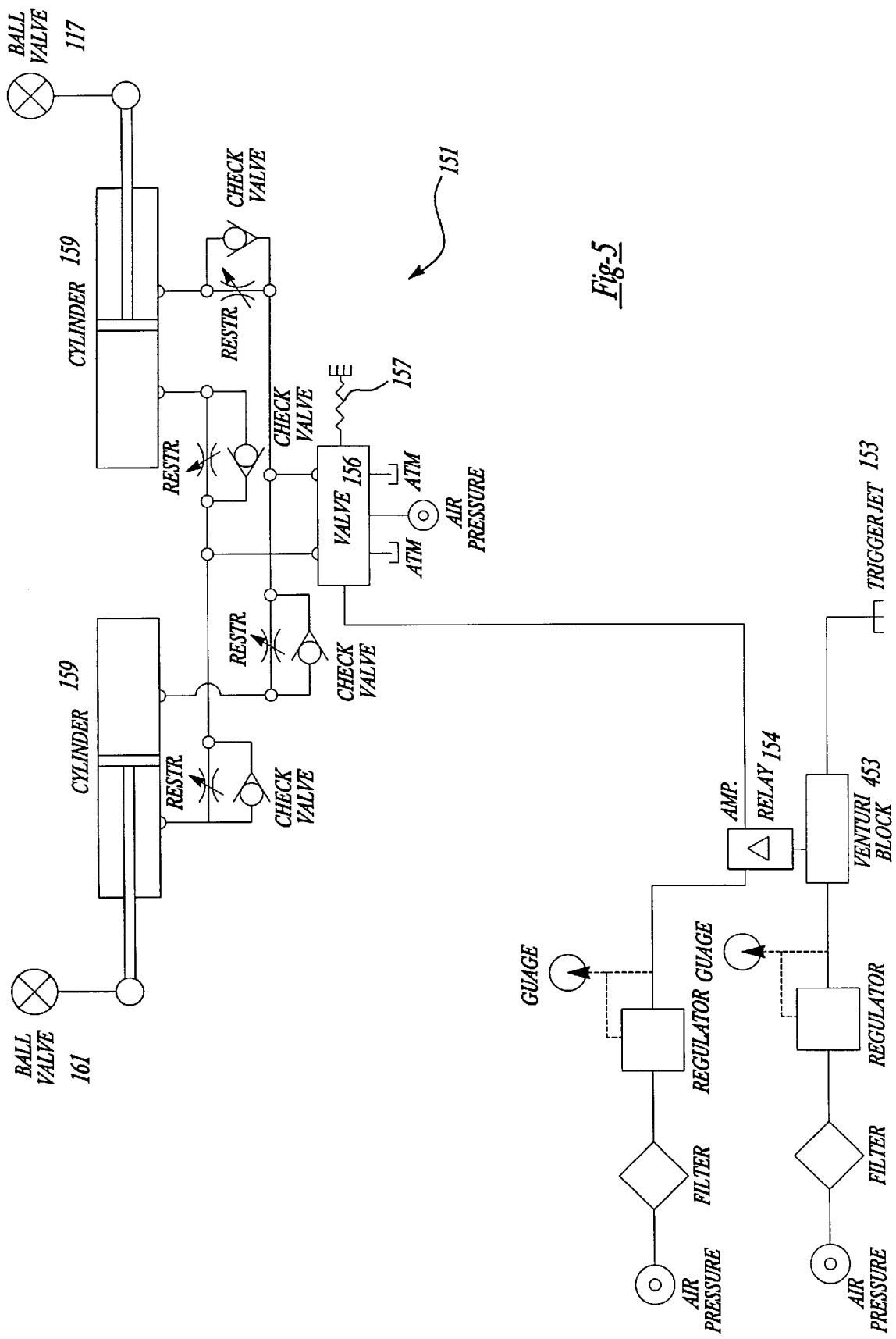
FIG. 5 is a schematic view showing the fluid control system employed in the preferred embodiment workpiece finishing system.
Figure 9:
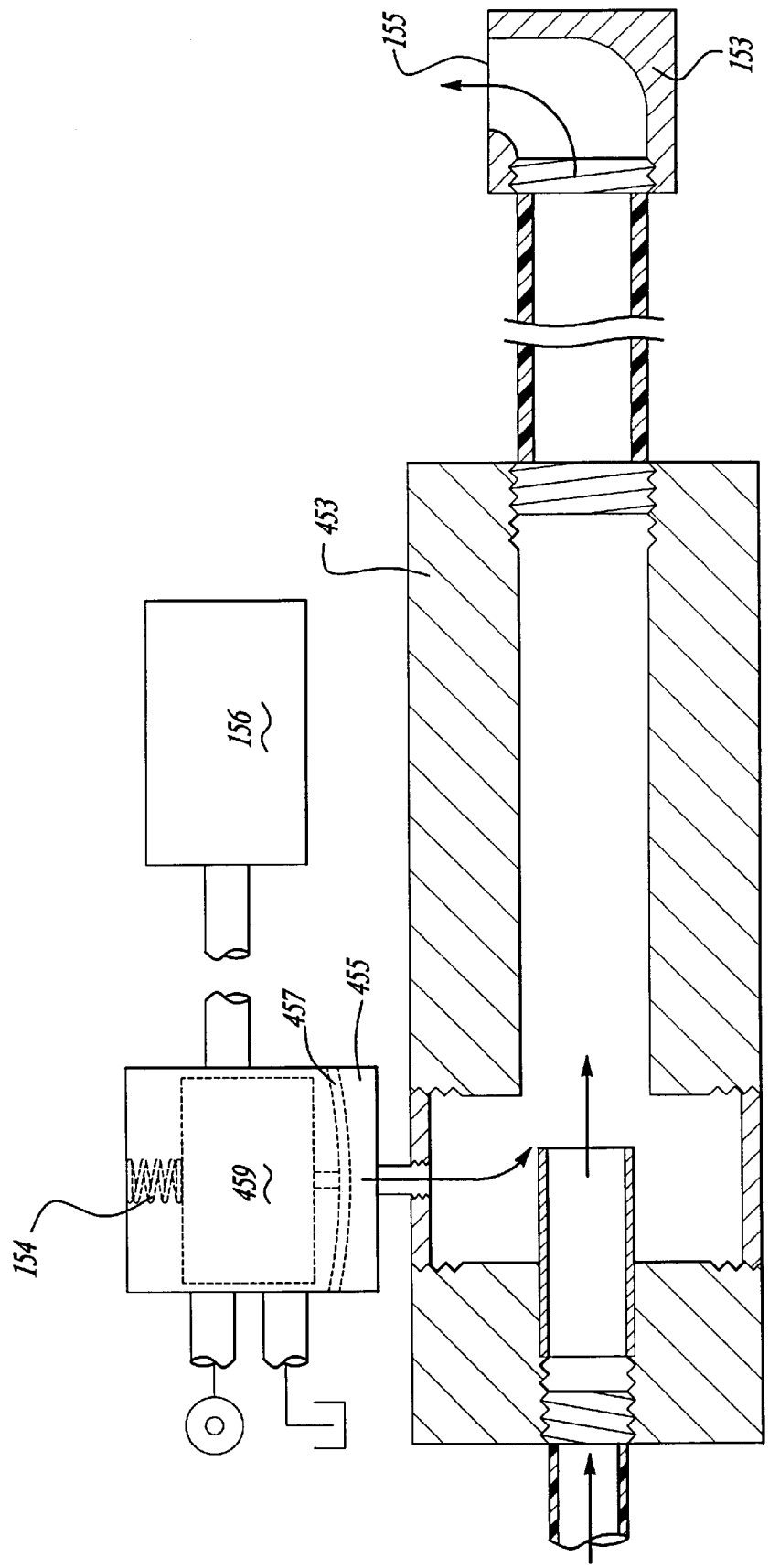
FIG. 9 is a sectional view showing a portion of the fluid control system employed in the preferred embodiment workpiece finishing system.

FIGS. 5 and 9 illustrate the preferred pneumatic control system 151 for allowing water to flow from the high pressure fluid pump 31 (see FIG. 1), which is continuously running. A trigger jet 153 is mounted to a handle of the nozzle. Trigger jet 153 operates at about 1.5 pounds per square inch of air pressure, and has an atmospherically accessible aperture connected to a downstream side of a venturi block 453 by a hose. The nozzle operator places his thumb over the open aperture 155 to create a positive pressure in a cavity 455 of venturi block 453, thereby upwardly moving a diaphragm 457 and a spring biased spool 459 of a connected amplifier relay 154. A sleeve is inserted into a smaller diameter, upstream bore of block 453, although it may not be necessary. An air pressure supply, filter, regulator and pressure gauge are connected to venturi block 435. Similarly, an air pressure supply, filter, regular and air pressure gauge are connected to amplifier relay 154. Activation of amplifier relay 154 then causes a valve 156 to change orientation against a biasing spring 157. Valve 156 is connected to an air pressure supply and to a pair of atmospheric outlets. Valve 156 is of a four-way, two-position, air pilot and spring return-type which applies piston advancing pressure to one side and dumps the other to the atmosphere, and vice versa. Amplifier relay 154 is preferably of a Clippert 2010 type controlling flow of a regulated air pressure supply of about 90 pounds per square inch.

A pair of valve operated, piston cylinders 159 are connected to valve 156 by way of flow control restrictors and check valves. The restrictors control the return air flow and, thus, the speed of the cylinder movement. A ball valve 161 is connected to a piston of the corresponding cylinder 159 for allowing water from high pressure fluid pump 31 (see FIG. 1) to the nozzle. The other cylinder 159 controls ball valve 117 which dumps the high pressure water to receiver tank 120 (see FIG. 1) before shutting off valve 161; this prevents system damage due to deadheading. Thus, pneumatic control circuit 151 provides remote control activation for the high pressure fluid. Alternately, a mechanical lever, electric switch or foot pedal can be employed with the nozzle or in another location for controlling the on/off spraying of the slurry out of the nozzle. An accumulator can also be used in combination with the high pressure fluid pump to enhance the pressure curve.

Figure 6:
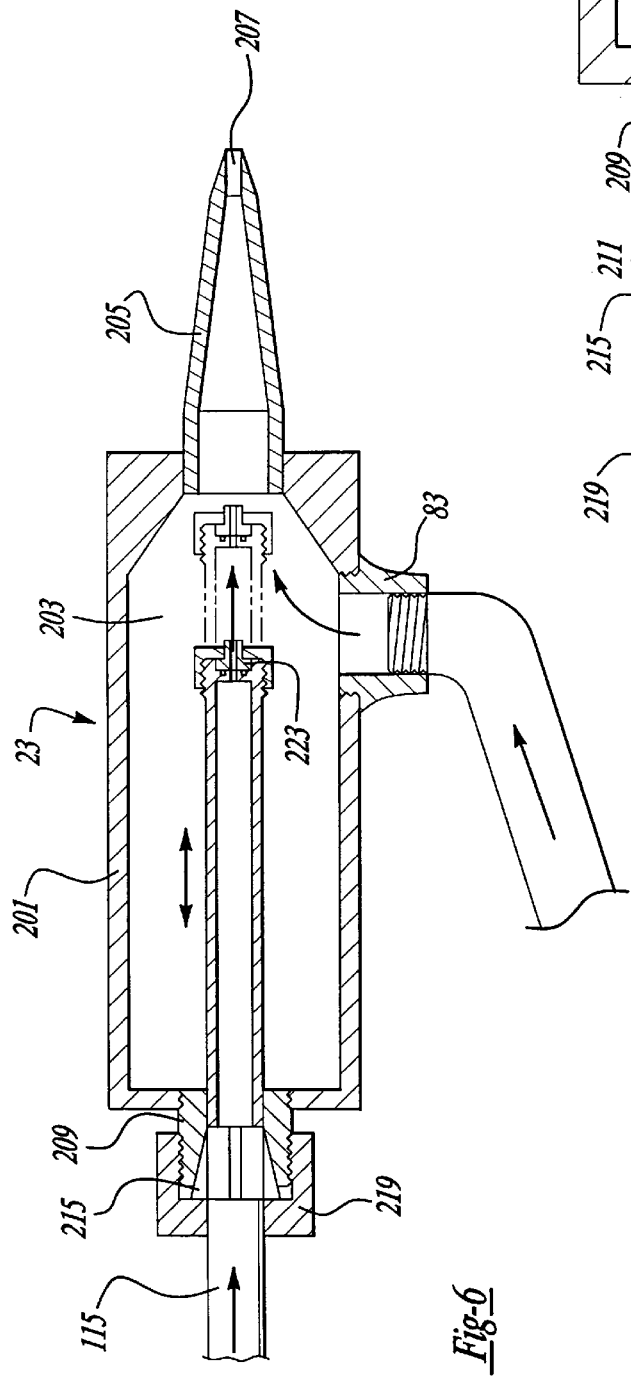
FIG. 6 is a longitudinally sectioned view showing the preferred embodiment nozzle employed in the workpiece finishing system.
Figure 8:
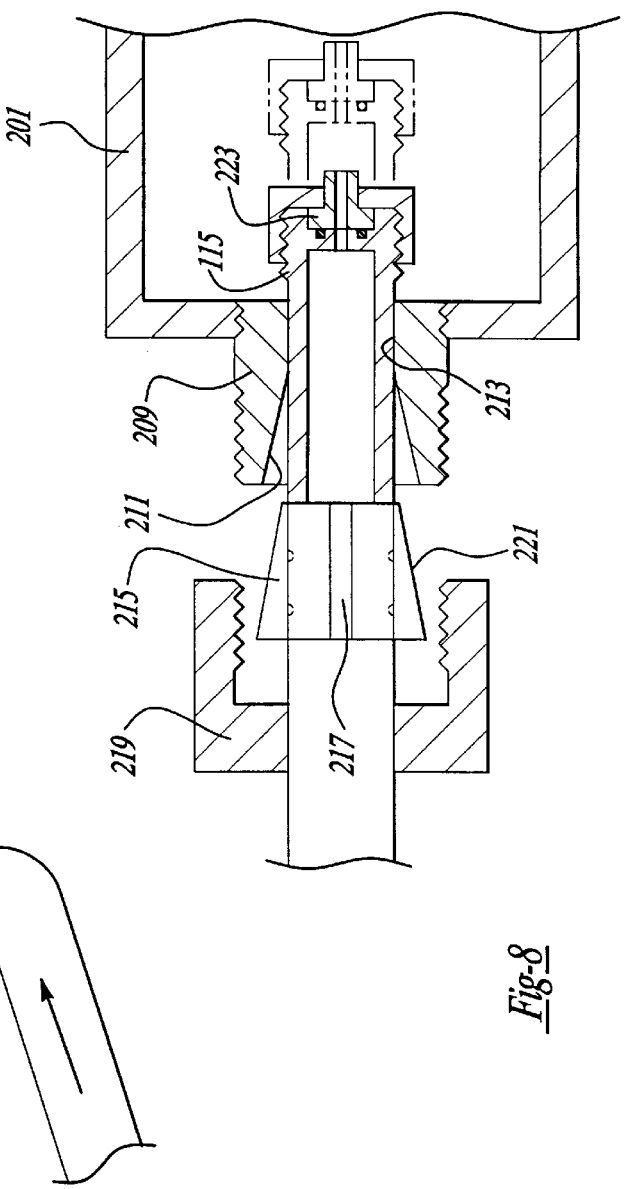
FIG. 8 is an exploded, longitudinally sectioned view showing the preferred embodiment nozzle employed in the workpiece finishing system.
Figure 7:
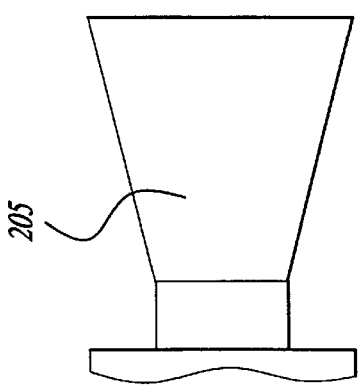
FIG. 7 is a top elevational view showing an outlet of the preferred embodiment nozzle employed in the workpiece finishing system.

The preferred embodiment nozzle construction is shown in FIGS. 6–8. Nozzle 23 has a steel body 201 with an internal slurry receiving chamber 203. A fan-shaped outlet 205, made of carbide is threadably fastened to a first end of body 201. Outlet 205 has a laterally elongated, slotted opening 207 for expelling the mixed slurry. Outlet 205 is burned from two separate pieces by an EDM process and then subsequently joined together by brazing or welding. It is alternately envisioned that the carbide outlet can be compression molded from powdered carbide metal. The portion of outlet 205 that engages body 201 is generally cylindrically shaped and hollow.

High pressure water inlet 115 is a rigid and hollow, hardened metal tube which is inserted into a second end of body 205 opposite outlet 205. An externally threaded metal fitting 209 threadably engages body 201 and has a frusto conical internal taper 211. Inlet 115 is movably disposed within an internal bore 213 of fitting 209. A metal bushing 215 is securely fastened around an external surface of inlet 115. A longitudinally elongated and open slot 217 allows bushing 215 to be circumferentially compressed when an internally threaded nut 219 enmeshes with threads of fitting 209. Bushing 215 has an external frusto conical shape 221 which generally matches surface 211 of fitting 209. Thus, inlet 115 can be longitudinally moved relative to body and grit inlet 83 to an infinite variety of position between the longitudinal end positions by tightening or loosening nut 219 relative to fitting 209; the engagement of nut 219 relative to fitting 209 varies the degree of interference and insertion of bushing 215 within fitting 209. Furthermore, a carbide tip 223 is pressfit inside a pocket in the distal end of inlet 115. An internally threaded outer cap is attached to inlet 115 and sandwiches a circular brim of tip 223 therebetween. Nozzle 23 acts in a venturi manner wherein the high pressure expulsion of water through inlet 115 causes a vacuum-like pressure which aids in drawing the concentrated grit/slurry mixture from grit inlet 83. Thus, when inlet 115 is retracted away from outlet 205, a greater venturi force is created for assisting in drawing more grit, thereby providing a grit-rich slurry solution. Conversely, further advancement of inlet 115 toward outlet 205 causes less of a venturi action and a greater restriction of area between inlet 115 and the adjacent portion of outlet 205, wherein there is less grit in the final sprayed slurry relative to the water content. This allows for an easy change in the slurry concentration for different types of workpieces without requiring separate fixed nozzles.

FIG. 10 illustrates an alternate embodiment nozzle 23 and workpiece 35. This exemplary nozzle is similar to the preferred one except that the outlet 205 has a vertically elongated, small width and fanned opening. The handle and trigger jet shown for this nozzle are also employed in the preferred embodiment nozzle.

Workpiece 35' is constructed from a cylindrical steel rod 251 having a pair of right angle bends, and a flat steel baseplate 253. Rod 251 and baseplate 253 are welded together at weld 255. The present invention finishing system is ideally suited for this type of curved workpiece 35' whereby the entire curved shape and the weld can be thoroughly finished with a minimum of effort. In contrast, traditional systems had great difficulty, if it could be done at all, in reaching tight curves and welds by use of large manually operated belted sanders, polishing wheels and buffing wheels. Workpiece 35' is subsequently chrome or nickel plated such as is disclosed in the following U.S. Patent Nos.: U.S. Pat. No. 3,992,211 entitled "Electroless Plating Composition" which issued to Skoll on Nov. 16, 1976; U.S. Pat. No. 3,963,527 entitled "Chromatizing Process and Composition" which issued to Lindemann on Jun. 15, 1976; and U.S. Pat. No. 3,791,801 entitled "Electroplated Steel Sheet" which issued to Ariga et al. on Feb. 12, 1974; all of which are incorporated by reference herewithin.

While the preferred embodiment workpiece finishing system and method have been described, it should be appreciated that other embodiments may be employed with the present invention. For example, a ferrite metal grit may be used if it can be obtained in a very fine form. Furthermore, the slurry spraying and recycling system can be used with a nozzle having an elongated wand for use in finishing an interior gun barrel bore for subsequent rifling. The present invention can also be used for finishing silicon wafers, but by using the high pressure impingement, acute angles and recovery system disclosed. Molds and dies can also be finished with the present invention system. Moreover, other baffle and filtering devices and arrangements can be employed for the recovery tank and system. Additionally, multiple, angled nozzles can be fixed in the spray booth and aimed at a moving workpiece, such as on a hanging or underlying conveyor system. It is intended by the following claims to cover these and any other departures from the disclosed embodiments which fall within the true spirit of this invention.

The invention claimed is:

1. A system for impinging a grit and fluid slurry to a workpiece, said system comprising:
   a nozzle having a first inlet and a second inlet;
   a receptacle operable to receive the slurry after the slurry is applied to the workpiece from the nozzle;
   a recovery tank connected to the receptacle, at least one baffle located in the recovery tank for directing the flow of the grit in the recovery tank, the grit substantially settling toward a bottom of the recovery tank;
   a first outlet connected to the recovery tank, the grit being operably transmitted from the first outlet of the recovery tank to the first inlet of the nozzle;
   a second outlet connected to the recovery tank; and
   a fluid pump operably pressurizing the fluid, the fluid being operably transmitted from the second outlet of the recovery tank to the fluid pump, the pressurized fluid being operably transmitted from the fluid pump to the second inlet of the nozzle;
   wherein the nozzle operably expels the pressurized fluid and the grit for application to the workpiece; and
   wherein the recovery tank operably encourages separation of the grit from the fluid of the slurry for re-use in the nozzle.

2. The system of claim 1 wherein the first outlet is located adjacent to the bottom of the recovery tank and the second outlet is located substantially adjacent to an upper portion of the recovery tank.

3. The system of claim 2 further comprising at least three baffles located in the recovery tank causing a serpentine flow pattern of the slurry.

4. The system of claim 2 wherein the recovery tank has a substantially triangular side view shape with the first outlet located at an apex of the triangular shape.

5. The system of claim 3 further comprising:
   a substantially horizontal shelf located above the baffles in the recovery tank;
   wherein fluid flows from below the shelf, through an aperture in the shelf and then above the shelf prior to exiting through the second outlet.

6. The system of claim 1 wherein the fluid is a liquid and the nozzle sprays the slurry upon the workpiece.

7. The system of claim 6 further comprising:
   a transmission line located between the recovery tank and the fluid pump serving to operably transmit the fluid;
   a filter connected to the transmission line; and
   a gravity separator connected to the transmission line between the second outlet of the recovery tank and the filter.

8. The system of claim 7 further comprising:
   at least one magnet located in the gravity separator serving to attract metallic particles in the liquid, and
   a set of separator baffles located in the separator serving to redirect the flow of the liquid through the separator;
   the separator and the filter serving to further remove the grit from the liquid.

9. The system of claim 1 further comprising a recirculation device causing the grit to remain at least partially suspended in a portion of the fluid when the nozzle is not discharging the slurry.

10. The system of claim 9 wherein the recirculation device further comprises:
    a bypass line connecting the outlet of the recovery tank to the inlet of the recovery tank; and
    a bypass pump pumping the grit through the bypass line;
    wherein the grit is recirculated and further mixed with the fluid in the recovery tank.

11. The system of claim 1 further comprising a plating device applying a material layer upon the workpiece after the workpiece has been finished by the slurry.

12. The system of claim 11 further comprising a curved surface located on the workpiece being smoothed by the slurry, the grit in the slurry being of a carbide-type material.

13. The system of claim 1 further comprising:
    a pneumatic trigger located on the nozzle; and
    a pneumatic amplifier connected to the pneumatic trigger for selectively controlling the flow of the fluid from the fluid pump to the nozzle.

14. The system of claim 1 wherein the nozzle flows the grit and the fluid in a venturi-type manner, at least one of the inlets of the nozzle is selectively movable relative to the other of the inlets of the nozzle for varying the slurry mixing properties in the nozzle.

15. The system of claim 1 wherein the grit is a carbide grit.

16. A recovery tank for use with a grit and liquid slurry, the recovery tank comprising:
    an outer casing having a substantially triangular side view shape with an apex located adjacent a bottom;
    a substantially horizontal shelf affixed to an upper portion of the casing;
    a slurry inlet connected to the casing below the shelf;

a series of baffles located in the casing and below the shelf, the slurry flowing through the baffles in a serpentine pattern;

a first outlet located near the apex of the casing operably receiving the grit, the grit becoming more concentrated in the slurry adjacent the first outlet; and a second outlet located above the shelf operably receiving the liquid flowing through the baffles and above the shelf.

17. The recovery tank of claim 16 wherein the casing has a substantially polygonal top view shape.

18. The recovery tank of claim 17 wherein the casing includes four substantially flat walls and the baffles are elongated in a substantially vertical direction.

19. The recovery tank of claim 16 further comprising a slurry spraying nozzle receiving the liquid transmitted through the second outlet and receiving the grit transmitted through the first outlet.

20. The recovery tank of claim 19 wherein at least a majority of the slurry sprayed from the nozzle is transmitted to the slurry inlet of the recovery tank.

* * * * *